Patented Sept. 11, 1951

2,567,268

UNITED STATES PATENT OFFICE 2,567,268

HYDROLYSIS OF STEROID SULFATES

Desmond Beall, Westmount, Quebec, Canada, assignor to Ayerst, McKenna & Harrison, Limited, St. Laurent, Quebec, Canada, a corporation of Canada No Drawing. Application March 8, 1951, Serial No. 214,646. In Canada January 31, 1949

6 Claims. (Cl. 260—397.4)

The present invention relates to the hydrolysis of water-soluble steroid sulphates to produce free steroids. More particularly, it relates to the hydrolysis of water-soluble steroid sulphates in which a sulphate radical is attached to the —3 or —17 position or both.

Prior art

The usual method for preparing free steroids from steroid sulphates comprises hydrolyzing said sulphates under strongly acid conditions. The prior art teaches that while the contact time between the sulphate and the acid may vary depending upon the particular steroid sulphate, elevated temperatures are required, for example 100° C., to obtain completion of the reaction in a reasonable time, and furthermore a pH adjustment in the neighborhood of 1.0 or lower is required.

For example, the hydrolysis of estrone sulphate required highly acid conditions, for example, pH 1 or less and the reaction had to be allowed to proceed at room temperature for several days or it could be accelerated by heating at 100° C. in which case the hydrolysis could be accomplished in ten minutes.

In any case strong acid conditions result in the production of objectionable hydrolysis artifacts. For example, on hydrolyzing equilin sulphate, iso-equilin as well as equilin is obtained. If dehydroisoandrosterone sulphate is hydrolyzed with hydrochloric acid 3-chloro-$\Delta^5$-androstenone-17 is obtained as hydrolysis artifact androsterone sulphate yields androstenone-17 besides free androsterone.

Applicant's development

The applicant has now found that water-soluble steroid sulphates containing a sulphate group in the —3 or —17 position or both can be hydrolyzed catalytically to free steroids without the formation of hydrolysis artifacts. The process comprises contacting a water-soluble steroid sulphate, or mixtures of such sulphates with dioxane. The reaction mixture may be allowed to stand at room temperature until the reaction is complete. Alternatively the reaction mixture may be heated so as to accelerate the rate of reaction.

In a preferred procedure the sulphate is dispersed in the dioxane by adding the dioxane with stirring. A preferred concentration of steroid sulphate is from about 1% to about 10% solids by weight of the solvent. The resulting dispersion is left at room temperature for long enough for hydrolysis to take place. This is usually about an hour.

Alternatively, the dispersion may be heated, for example, up to 100° C. for instance, by placing in a boiling water-bath. This causes the hydrolysis to become complete in a short time sometime in as little as about 3 minutes in the case of oestrogenic steroid sulphates and in as little as about 10 minutes for certain neutral steroid sulphates.

The time needed for hydrolysis will vary from compound to compound and may be determined empirically. In any case the time is considerably less than in prior art methods despite the fact that the conditions are less drastic and do not result in side reactions.

The ability to convert, by hydrolysis, the water-soluble steroid sulphates to the water-insoluble free forms, as above outlined, is a property peculiar to dioxane. It does not occur under the above conditions upon contacting the same starting materials with other organic solvents. The addition to the dioxane of relatively small amounts, for example as little as about 5%, of nitrogenous bases, such as pyridine or aniline, inhibits the hydrolysis.

Up to about 10% by volume of alcohol may be added to the dioxane without interfering with the reaction. And in many cases up to about 10% by volume of water may be present without inhibiting the reaction substantially.

The compounds which can by the process of the invention be hydrolyzed to the corresponding free steroids are water-soluble steroid sulphates in which the sulphate group is attached to the nucleus at the —3 or the —17 position or both. Estrogenic or neutral steroids of this type are preferred. Among the oestrogen sulphates are for instance estrone - 3 - monosulphate, equilin - 3 - monosulphate, equilenin - 3 - monosulphate, estradiol —3 or 17 monosulphate or —3, 17-disulphate, dihydroequilin —3 or —17 monosulphate, or —3, 17-disulphate, dihydroequilenin —3 or —17 monosulphate, or —3, 17-disulphate, a purified water soluble ether-insoluble estrogenic concentrate prepared by the process of U. S. application Serial No. 64,834, filed December 11, 1948, Beall and Grant. Among the neutral steroids are for instance, androsterone-3-monosulphate, testosterone-17-monosulphate, dehydroisoandrosterone - 3 - monosulphate and $\Delta^5$-pregnenol(3)-one-(20)-3-monosulphate.

EXAMPLE 1

100 mg. of the sodium salt of dehydroisoandrosterone 3-monosulphate are suspended in 2 ml. of dioxane (containing 10% water) and heated in a water bath at 100° C. for 30 minutes. The suspension is cooled, diluted to 20 ml. with water and extracted 3 times with ether. The combined ether extracts are taken to dryness and the residue identified by its melting point and its infra-red pattern, as being dehydroisoandrosterone.

EXAMPLE 2

100 mg. of the sodium salt of $\Delta^5$-pregnenol(3)-one-20-3-monosulphate are suspended in 3 ml. of dioxane and heated in a water bath at 100° C. for 10 minutes. The suspension is cooled, diluted to 30 ml. with water and extracted 3 times with ether. The combined ether extracts are taken to dryness and the residue identified as $\Delta^5$-pregnenol(3)-one-(20) by its melting point and its infra-red pattern.

EXAMPLE 3

100 mg. of the sodium salt of testosterone 17-monosulphate was stirred with 3 ml. of dioxane (containing 1% water) left at room temperature for 60 minutes. After the addition of 27 ml. of water the resulting precipitates were centrifuged off, washed with water and dried in a desiccator. The residue was identified as testosterone by its melting point and its infra-red pattern.

EXAMPLE 4

155 mg. of the sodium salt of estrone sulphate was stirred with 2 ml. of dioxane and the mixture was left at room temperature for one hour. 8 ml. of water were then added and the resulting precipitate of estrone was filtered off, washed with water and dried in a desiccator. The yield of estrone obtained was 111 mg.

M. P. 256–7° C., $[\alpha]_D + 160°$ (dioxane)

EXAMPLE 5

200 mg. of the sodium salt of equilin sulphate was stirred with 2.5 ml. of dioxane and left at room temperature for one hour. After the addition of 12 ml. of water the resulting precipitate was filtered off, washed with water and dried in a desiccator. The yield of equilin was 140 mg.

M. P. 237–8° C., $[\alpha]_D + 302°$ (dioxane)

EXAMPLE 6

150 mg. of the sodium salt of estradiol monosulphate was stirred with 3 ml. of dioxane and left at room temperature for one hour. After the addition of 15 ml. of water the resulting precipitate was centrifuged off, washed with water and dried in a desiccator. The yield of estradiol obtained was 104 mg.

EXAMPLE 7

1 g. of purified water-soluble, ether-insoluble estrogenic concentrate, from pregnant mare's urine prepared by the procedure of patent application Serial No. 64,834, assaying 250 mg. of estrogens by Kober (calculated as sodium estrone sulphate) was mixed with 25 ml. of dioxane and left for one hour at room temperature. On adding 200 ml. of water a heavy precipitate formed which was readily soluble in ether. Kober determinations of the residual water and ether solutions showed that all the potency was in the ether phase. That is the water-soluble conjugated estrogens had been converted to the free ether-soluble form.

EXAMPLE 8

3 ml. of dioxane were added to 320 mg. of the sodium salt of estrone sulphate and the mixture was heated in a boiling water bath for two minutes and then diluted with 15 ml. of water. The resulting precipitate of estrone was filtered off and dried in a vacuum desiccator. The yield of estrone was 220 mg.

M. P. 255–7° C.

This application is a continuation-in-part of U. S. applications S. N. 76,638, filed February 15, 1949, now abandoned and S. N. 176,055 filed July 26, 1950.

I claim:

1. A process for hydrolyzing a water-soluble steroid sulphate, comprising, contacting said steroid sulphate with dioxane to convert the water-soluble steroid to the free steroid.
2. A process according to claim 1, in which the steroid sulphate is a neutral steroid sulphate.
3. A process according to claim 2, in which the steroid sulphate is a sulphate of an estrogenic steroid.
4. A process for the hydrolysis of a material containing sulphate steroids, comprising, dispersing said material in dioxane, allowing said dispersion to stand for a period to allow hydrolysis to take place, and then recovering the free steroid from the reaction mixture.
5. A process according to claim 4, wherein the dispersion is heated.
6. A process according to claim 4, wherein the free steroid is recovered by diluting the reaction mixture with water to cause a precipitate of the free steroid, and the precipitate is recovered.

DESMOND BEALL.

No references cited.